US008515623B2

United States Patent
Ono et al.

(10) Patent No.: US 8,515,623 B2
(45) Date of Patent: Aug. 20, 2013

(54) STEERING APPARATUS

(75) Inventors: Eiichi Ono, Toyota (JP); Yuji Muragishi, Owariasahi (JP); Shinsuke Sato, Toyota (JP); Yutaka Onuma, Miyoshi (JP); Kimiaki Ono, Gotemba (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 0 days.

(21) Appl. No.: 13/496,767

(22) PCT Filed: Jan. 11, 2011

(86) PCT No.: PCT/JP2011/050296
§ 371 (c)(1),
(2), (4) Date: Mar. 16, 2012

(87) PCT Pub. No.: WO2011/086998
PCT Pub. Date: Jul. 21, 2011

(65) Prior Publication Data
US 2012/0173082 A1 Jul. 5, 2012

(30) Foreign Application Priority Data

Jan. 14, 2010 (JP) ................................ 2010-006200

(51) Int. Cl.
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |

(52) U.S. Cl.
USPC .......................................................... 701/42

(58) Field of Classification Search
USPC .......................................................... 701/42
See application file for complete search history.

(56) References Cited

U.S. PATENT DOCUMENTS

2005/0216157 A1* 9/2005 Sakata ........................... 701/42
2010/0049375 A1 2/2010 Tanimoto FOREIGN PATENT DOCUMENTS
| JP | A-2001-151133 | * 6/2001 |
| JP | A-2003-127886 |   5/2003 |

(Continued)

OTHER PUBLICATIONS

Translation of international Search Report mailed Mar. 8, 2011 issued in International Patent application No. PCT/JP2011/050296.*

(Continued)

Primary Examiner — Mary Cheung
Assistant Examiner — Frederick Brushaber
(74) Attorney, Agent, or Firm — Oliff & Berridge, PLC

(57) ABSTRACT

A steering apparatus that by effecting a predetermined relationship between a steering wheel angle and a yaw angular velocity generated for a vehicle makes a direction $\theta_{gaze\,\beta}$, seen from the view point of the driver, of a target destination point on a target course for vehicle travel after a predetermined forward gaze time, and a direction $\delta_{SW}$ of a steering wheel reference position, seen from the view point of the driver, coincide with each other. The steering apparatus can accordingly enhance the sensation of driver-vehicle togetherness, thereby enabling steering to be performed that matches driver sensation and does not cause discomfort.

8 Claims, 11 Drawing Sheets

(56) References Cited

FOREIGN PATENT DOCUMENTS

JP      A-2004-217114      8/2004
WO    WO 2008/136456 A1    11/2008

OTHER PUBLICATIONS

U.S. Appl. No. 13/063,668, filed Jun. 14, 2011 in the name of Ono et al.

Shimizu et al., "Effects and Design of Steering System with Variable Gear-ratio according to Vehicle Speed and Steering Wheel Angle," 1999, pp. 9-12, No. 21-99 (with Abstract).

May 28, 2013 Office Action issued in Japanese Application No. 2010-006200 (with translation).

* cited by examiner

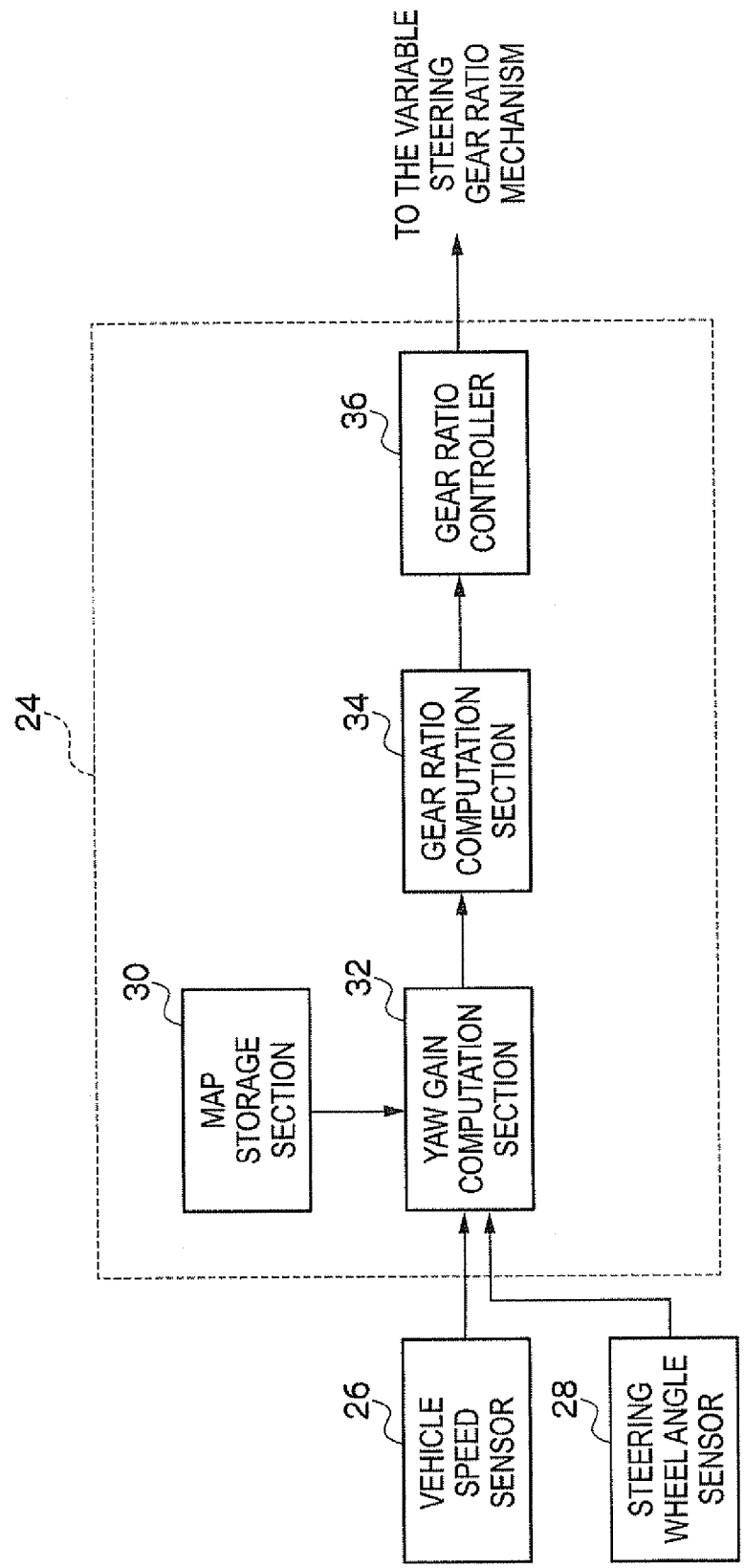

STEERING GEARBOX

STEERING APPARATUS

TECHNICAL FIELD

The present invention relates to a steering apparatus, and in particular to a steering apparatus for realizing a relationship between steering wheel angle and yaw angular velocity.

BACKGROUND ART

In known technology (Non-Patent Document 1) a steering gear ratio is set such that the angle formed between the current vehicle travelling direction and a gaze point is proportional to the steering wheel angle, based on experimental data "when entering a corner, irrespective of the vehicle speed a driver gazes at a ground point on a target path which will be passed through after about 1.2 seconds".

Non-Patent Document 1: Technical Proceedings Pre-publication No. 21-99, 1999 "Effects and Design of Steering System with Variable Gear-ratio According to Vehicle Speed and Steering Wheel Angle" by Yasuo SHIMIZU and others, published by the Society of Automotive Engineers of Japan.

DISCLOSURE OF INVENTION

Technical Problem

However, in the above Non-Patent Document 1 reference is only made to "making the steering gear ratio proportional to", and there is no disclosure regarding the setting methods, such as a specific proportional gain. There is therefore a problem with the technology described in the Non-Patent Document 1 that if the gear ratio is too small then the actual steering angle tends to become large too quickly with respect to the steering wheel angle, resulting in a driver feeling discomfort.

The present invention addresses the above problem.

Solution to Problem

In order to achieve the above object, a steering apparatus of a first aspect of the present invention is configured so as to effect a predetermined relationship between a steering wheel angle and a yaw angular velocity generated at a vehicle, the relationship being predetermined such that a direction of a target destination point on a target course for vehicle travel as seen from the view point of a driver after a predetermined forward gaze time and a direction of a reference position on the steering wheel as seen from the view point of the driver are associated with each other.

In the above steering apparatus the direction of the target destination point on the target course for vehicle travel as seen from the view point of the driver after the predetermined forward gaze time and the direction of the reference position on the steering wheel as seen from the view point of the driver are associated with each other by effecting the predetermined relationship between the steering wheel angle and the yaw angular velocity generated at a vehicle.

The above steering apparatus thus associates the direction of the target destination point on the target course for vehicle travel as seen from the view point of the driver after the predetermined forward gaze time and the direction of the reference position on the steering wheel as seen from the view point of the driver with each other. With the above steering apparatus a driver hence does not feel discomfort since such a steering apparatus is able to enhance the sensation of driver-vehicle togetherness, enabling steering wheel operation to be performed matching driver sensation.

Advantageous Effects of Invention

As explained above, the steering apparatus of the first aspect of the present invention thus associates the direction of the target destination point on the target course for vehicle travel as seen from the view point of the driver after the predetermined forward gaze time with the direction of the reference position on the steering wheel as seen from the view point of the driver. The steering apparatus thereby exhibits the advantageous effect of a driver not feeling discomfort due to the steering apparatus enabling enhanced sensation of driver-vehicle togetherness, and enabling steering wheel operation to be performed matching driver sensation.

BRIEF DESCRIPTION OF DRAWINGS

FIG. 2 is a block diagram illustrating a configuration of a computer of a vehicle steering apparatus according to the first exemplary embodiment of the present invention.

BEST MODE FOR CARRYING OUT THE INVENTION

Detailed explanation follows regarding exemplary embodiments of the present invention, with reference to the drawings. In the present exemplary embodiment explanation is given of an example in which the present invention is applied to a vehicle steering apparatus for mounting to a vehicle to control a vehicle steering gear ratio.

Figure 1:
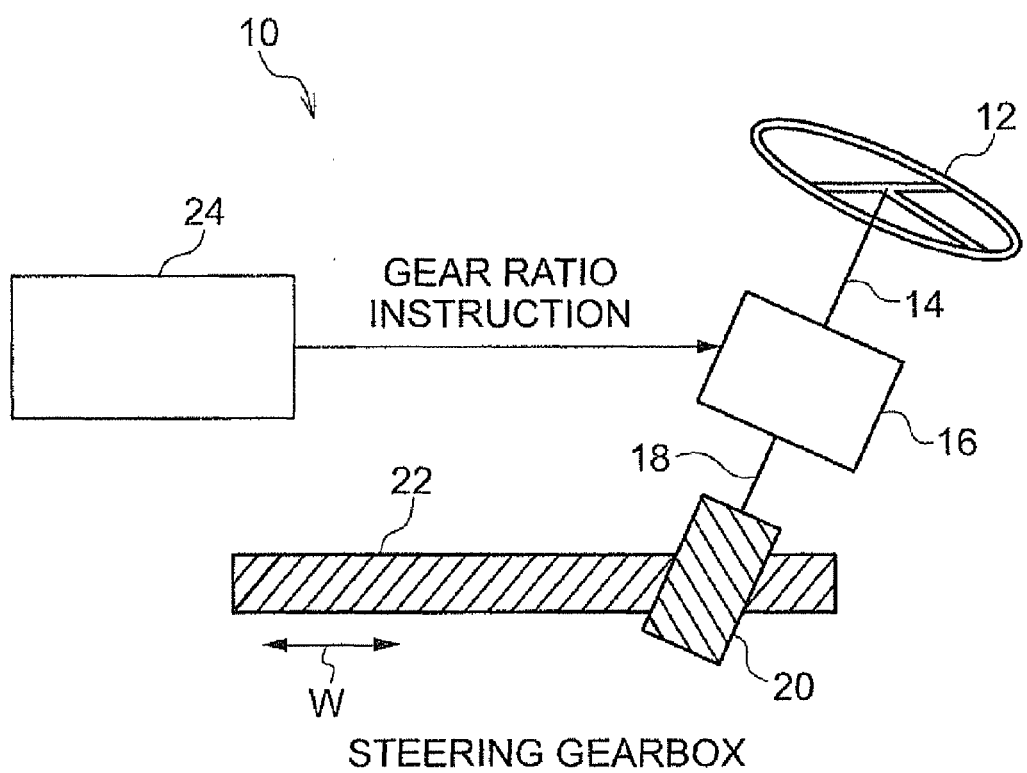
FIG. 1 is a schematic diagram illustrating a configuration of a vehicle steering apparatus according to a first exemplary embodiment of the present invention.

As shown in FIG. 1, a vehicle steering apparatus 10 according to an exemplary embodiment of the present invention includes a rotating shaft 14 interlocked to a steering wheel 12 and connected to a variable steering gear ratio mechanism 16. An output shaft 18 projects out from the variable steering gear ratio mechanism 16, and a pinion 20 coupled to the output shaft 18 meshes with a rack shaft 22 coupled to steerable wheels, not shown in the drawings.

Rotation of the steering wheel 12 is hence transmitted through the variable steering gear ratio mechanism 16 to the pinion 20 so as to move the rack shaft 22 along its axial direction (the arrow W direction of FIG. 1), thereby turning the steerable wheels.

The variable steering gear ratio mechanism 16 is coupled up to a computer 24. The variable steering gear ratio mechanism 16 is configured by any known structure. The variable steering gear ratio mechanism 16 is configured to change the steering gear ratio of the variable steering gear ratio mechanism 16 according to a gear ratio instruction signal output from the computer 24.

As shown in FIG. 2, the computer 24 is connected to a vehicle speed sensor 26 for detecting the speed of the vehicle to which it is installed, and to a steering wheel angle sensor 28 for detecting the steering angle of the steering wheel 12 (the steering wheel angle).

The computer 24 includes a CPU, RAM, and ROM stored with a program for executing a gear ratio control program, described later. The computer 24 has a functional configuration as set out below. The computer 24 includes: a map storage section 30 pre-stored with a map indicating the relationship between steering angle of the steering wheel 12, vehicle speed and yaw angular velocity gain; a yaw gain computation section 32 for, based on the vehicle speed from the vehicle speed sensor 26 and the steering wheel angle from the steering wheel angle sensor 28, computing a target value of yaw angular velocity gain according to a map stored in the map storage section 30; a gear ratio computation section 34 for computing a steering gear ratio for realizing the computed target value of yaw angular velocity gain; and a gear ratio controller 36 for outputting a gear ratio instruction signal so as to change to the computed steering gear ratio.

Explanation follows regarding the principles behind the present exemplary embodiment.

It is known from the description of a driver model in the specification of Japanese Patent Application No. 2009-9863 that the forward gaze angle, which is the angle of deviation between the vehicle progression direction and the direction of a target destination point on a target course for vehicle travel after a predetermined forward gaze time, and the yaw angular velocity after a specific duration have a proportional relationship to each other that is not dependent on the vehicle speed.

Namely, based on a deviation angle $\theta_{gaze}$ between the vehicle progression direction (speed vector direction) and the direction of a vehicle target destination point after a forward gaze time T (see FIG. 3A and FIG. 3B), a predicted value $r_{pre}$ of yaw angular velocity is computed according to Equation (1) below as a predicted vehicle motion value caused by driver steering wheel operation.

Equation (1)

$$r(t+\tau) = k_r \cdot \theta_{gaze}(t) \tag{1}$$

Wherein: $k_r$ is transmission gain from forward gaze angle $\theta_{gaze}$ to yaw angular velocity r, and $\tau$ is dead time. Dead time $\tau$ is the time taken to match the timing of a change in vehicle motion to the timing when the radius of curvature of the travelling course is changed, and the dead time $\tau$ is a predetermined duration.

Equation (1) above expresses the result of a driver performing steering wheel operation based on the forward gaze angle.

As a result of logical analysis it can be seen that the relationship shown in the following Equation (2) holds between forward gaze time $T_{gaze}$ and the transmission gain $k_r$ from forward gaze angle $\theta_{gaze}$ to yaw angular velocity r.

Equation (2)

$$k_r \cdot T_{gaze} = 2 \tag{2}$$

In the present exemplary embodiment forward gaze time $T_{gaze}$ is set as a fixed time between 2.5 seconds and 3.5 seconds.

It can be seen that the relationship in the following Equation (3) holds between the forward gaze time $T_{gaze}$ and the dead time $\tau$.

Equation (3)

$$T_{gaze} = 3 \cdot \tau \tag{3}$$

Figure 4B:
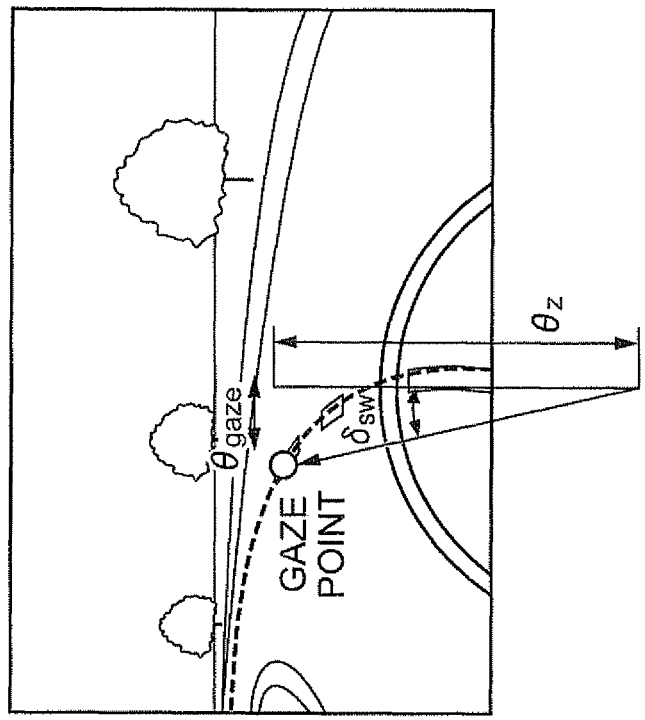
FIG. 4B is an image illustrating an angle of deviation between a vehicle front-rear direction and a direction towards a target destination point.

Operating the steering wheel based on the forward gaze angle shows that a driver intends to pass through the vehicle target destination point after the forward gaze time. The present exemplary embodiment has noticed from this effect that such characteristics as the sensation of driver-vehicle togetherness, steering characteristics and agility are enhanced by making direction of the forward gaze point indicating the output of vehicle motion and the direction of a reference position on the steering wheel indicating the amount of driver steering operation coincide with each other, as shown in FIG. 4B.

Figure 3B:
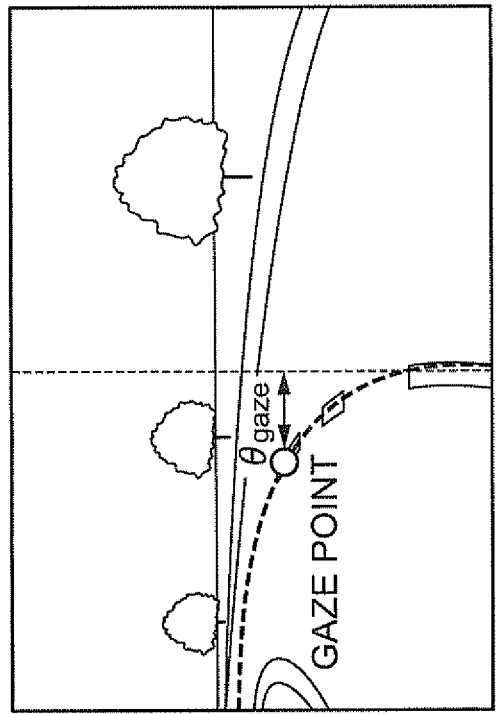
FIG. 3B is an image illustrating an angle of deviation between a vehicle travelling direction and a direction towards a target destination point.
Figure 3A:
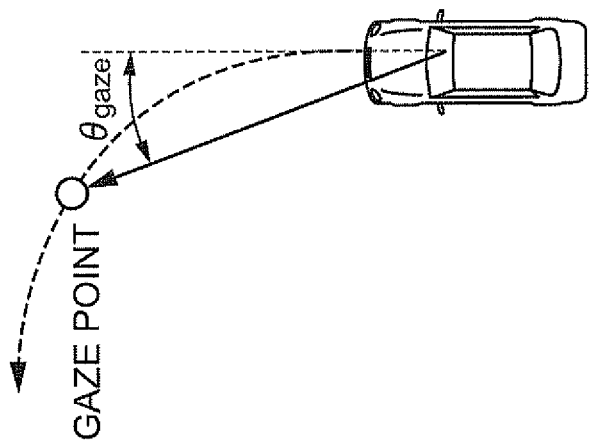
FIG. 3A is an image illustrating an angle of deviation between a vehicle travelling direction and a direction towards a target destination point.

However, since the forward gaze angle in FIG. 3A and FIG. 3B is defined with respect to the vehicle travelling direction, however in order to match the relationship of the steering wheel angle it is necessary to make the vehicle front-rear direction of the seat in which the driver is seated as the reference. The present exemplary embodiment hence, as shown in the following Equation (4), employs the concept of making the following angles coincide with each other: the angle arrived at by adding the vehicle slip angle to the forward gaze angle (the angle of deviation between the vehicle front-rear direction and the direction of a target destination point on a target course for vehicle travel after a predetermined forward gaze time) and the steering wheel angle (the relative angle between a reference position when the steering wheel is in the neutral state and the current location of the steering wheel reference position).

Equation (4)

$$\theta_{gaze\beta} = \theta_{gaze} + \beta \tag{4}$$

Figure 4A:
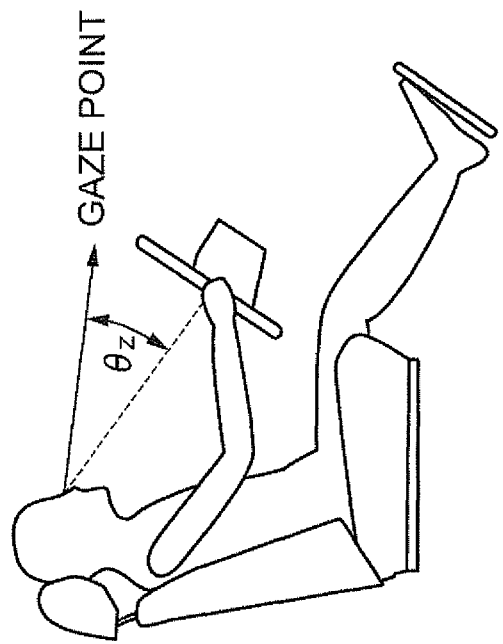
FIG. 4A is an image illustrating a relative depression angle.

As shown in FIG. 4A, the following Equation (5) can be obtained wherein $\theta_z$ is the relative depression angle between the steering wheel center and the forward gaze point, and under conditions when the steering wheel angle $\delta_{SW}$ coincides with the direction of the gaze point.

Equation (5)

$$\tan(\delta_{sw} - K_{roll} \cdot r \cdot v) = \frac{\theta_{gaze\beta}}{\theta_z} = \frac{\theta_{gaze} + \beta}{\theta_z} \tag{5}$$

The above Equation (5) takes into consideration an apparent reduction in steering wheel angle due to a roll motion occurring. $K_{roll}$ is the roll rate.

Since the relationship of Equation (2) holds between the forward gaze time $T_{gaze}$ and the transmission gain $k_r$ from the forward gaze angle $\theta_{gaze}$ to the yaw angular velocity r, the forward gaze angle $\theta_{gaze}$ can be expressed by the following Equation (6).

Equation (6)

$$\theta_{gaze} = \frac{T_{gaze}}{2} \cdot r \qquad (6)$$

Under linear vehicle motion modeling the vehicle slip angle β is expressed by the following Equation (7).

Equation (7)

$$\beta = \left(\frac{l_r}{v} - \frac{ml_r}{2lC_r} \cdot v\right) \cdot r \qquad (7)$$

The following Equation (8) can be obtained by re-writing above Equation (5) using Equation (6) and Equation (7).

Equation (8)

$$\tan(\delta_{sw} - K_{roll} \cdot r \cdot v) = \frac{\frac{T_{gaze}}{2} + \frac{l_r}{v} - \frac{ml_r}{2lC_r} \cdot v}{\theta_z} \cdot r \qquad (8)$$

Wherein: $C_r$ is rear wheel cornering power; l is the wheel base; $l_r$ is the separation distance from the center of gravity to the rear axle $l_r$; m is the vehicle mass; and v is the vehicle speed.

Figure 5A:
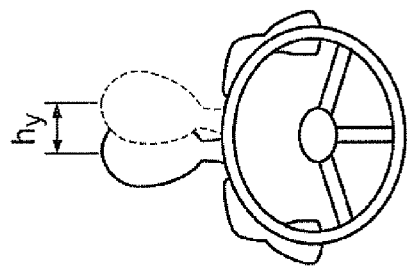
FIG. 5A is an image illustrating a state in which a driver's head has moved.

The relationship in Equation (8) is a relationship equation under the assumption that the point of view of the driver does not change. However, it is necessary to consider changes to the posture of the driver, namely to the position of the point of view of the driver, occurring during actual vehicle travel due to the influence of lateral acceleration. As shown in FIG. 5A, the driver's head is moved by $h_y$ proportional to vehicle lateral acceleration in the direction to resist the lateral acceleration, and the center of the steering wheel as viewed from the driver is moved towards the turn outside by $\theta_d$ as derived by following Equation (9).

Equation (9)

$$\theta_d = \tan^{-1}\frac{h_y}{h_x} \qquad (9)$$

Figure 5B:
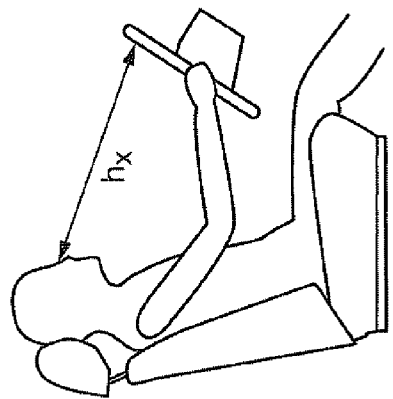
FIG. 5B is an image illustrating the separation distance between a driver's head and a steering wheel center.

The separation distance from the driver's head to the steering wheel center is $h_x$ (see FIG. 5B).

Figure 5C:
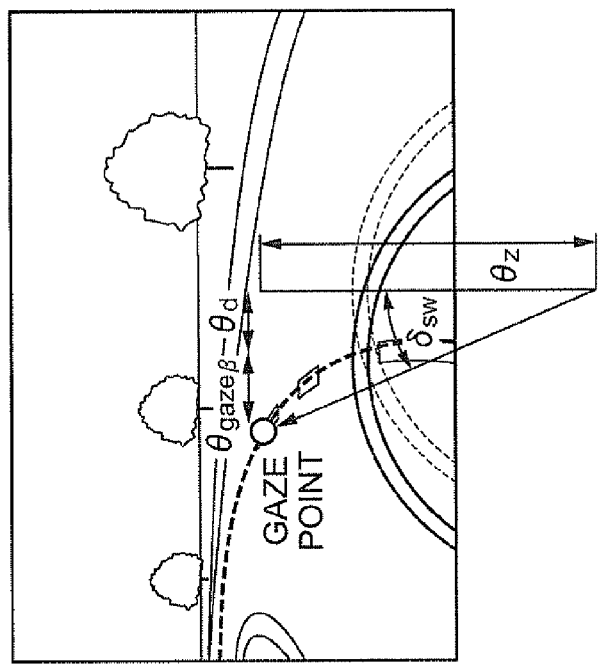
FIG. 5C is an image illustrating a relationship between a steering wheel angle, a forward gaze angle and a relative depression angle when a driver's head has moved.

Therefore, as shown in FIG. 5C, the following Equation (10) expresses conditions to coincide the direction of steering wheel angle $\delta_{SW}$ during driver head movement (the direction of the steering wheel reference position) with the direction of the forward gaze point.

Equation (10)

$$\tan(\delta_{sw} - K_{roll} \cdot r \cdot v) = \frac{\left(\frac{T_{gaze}}{2} + \frac{l_r}{v} - \frac{ml_r}{2lC_r} \cdot v\right) \cdot r + \theta_d}{\theta_z} \qquad (10)$$

In the present exemplary embodiment the movement $h_y$ when a lateral acceleration has occurred of 9.8 (m/s²)=$h_{ymax}$, and $\theta_d$ is formulated by the following Equation (11).

Equation (11)

$$\theta_d = \tan^{-1}\frac{h_{ymax} \cdot g_y}{9.8 \cdot h_x} \qquad (11)$$

The relationship between the lateral acceleration and the yaw angular velocity (under conditions in which the slip angle does not increase) is expressed by the following Equation (12).

Equation (12)

$$g_y = v \cdot r \qquad (12)$$

The relationship of the following Equation (13) is derived by considering Equation (11) and Equation (12) above.

Equation (13)

$$\tan(\delta_{sw} - K_{roll} \cdot r \cdot v) = \frac{\left(\frac{T_{gaze}}{2} + \frac{l_r}{v} - \frac{ml_r}{2lC_r} \cdot v\right) \cdot r + \tan^{-1}\frac{h_{ymax} \cdot r \cdot v}{9.8 \cdot h_x}}{\theta_z} \qquad (13)$$

The relative depression angle $\theta_z$ holds the relationship expressed by the following Equation (14), based on the steering wheel center depression angle $\theta_{zsw}$ from the driver's view point to the steering wheel center, the forward gaze time $T_{gaze}$, and the eye-point height $h_{eye}$.

Equation (14)

$$\theta_z = \theta_{zsw} - \tan^{-1}\frac{h_{eye}}{T_{gaze} \cdot v} \cong \theta_{zsw} - \frac{h_{eye}}{T_{gaze} \cdot v} \qquad (14)$$

Equation (13) above can be written as the following Equation (15) using Equation (14) above.

Equation (15)

$$\tan(\delta_{sw} - K_{roll} \cdot r \cdot v) = \frac{\left(\frac{T_{gaze}}{2} + \frac{l_r}{v} - \frac{ml_r}{2lC_r} \cdot v\right) \cdot r + \tan^{-1}\frac{h_{ymax} \cdot r \cdot v}{9.8 \cdot h_x}}{\theta_{zsw} - \frac{h_{eye}}{T_{gaze} \cdot v}} \qquad (15)$$

The following assumption is made.

$$h_{ymax} \cdot r \cdot v << 9.8 \cdot h_x$$

Using this formula enables Equation (15) to be written as the following Equation (16).

$$r = \frac{\theta_{zsw} - \frac{h_{eye}}{T_{gaze} \cdot v}}{\frac{T_{gaze}}{2} + \frac{l_r}{v} - \frac{ml_r}{2lC_r} \cdot v + \frac{h_{ymax} \cdot v}{9.8 \cdot h_x}} \cdot \tan(\delta_{sw} - K_{roll} \cdot r \cdot v) \quad (16)$$

Figure 6:
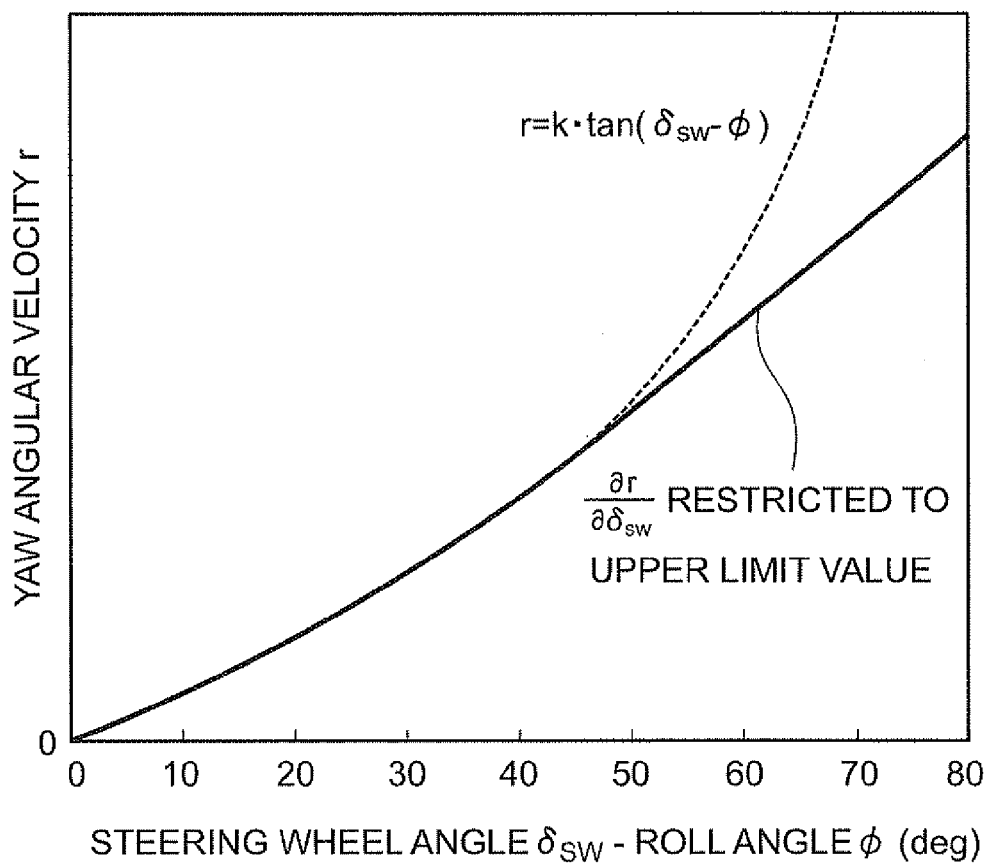
FIG. 6 is a graph illustrating a relationship of yaw angular velocity to a relative angle of a steering wheel angle to a roll angle.

In Equation (16) above the yaw angular velocity r is expressed as proportional to the tangent to the relative angle ($\delta_{SW}$-$\phi$) between the steering wheel angle $\delta_{SW}$ and the roll angle $\phi$ (=$K_{roll}$·r·v), as shown by the intermittent line of FIG. 6. Equation (16) expresses an example of a relationship between the steering wheel angle and the yaw angular velocity in the present invention.

In cases in which control is performed in a steering operation system based on Equation (16), when the relative angle between the steering wheel angle and the roll angle approaches 90 degrees the yaw angular velocity becomes infinitely large, and all driver operations are performed in a steering wheel angle region up to 90 degrees. Such a characteristic has the advantage that no steering wheel grip change is required. However such a characteristic suffers from the disadvantage of a loss of handling when changes in vehicle movement in response to steering wheel operation are sensed too keenly.

A vehicle was employed in order to investigate excessive sensitivity to changes in vehicle motion and characteristics detrimental to handling. Various changes were made to the gradient of yaw angular velocity against steering wheel angle, and tasks allocated, such as steering correction from a steady circular turn, and sensory assessment tests performed. As a result of these sensory assessment tests it has been found that the upper limit to the gradient of the yaw angular velocity against steering wheel angle, namely the gradient of yaw angular velocity against steering wheel angle at the point where setting the gradient there or above results in a loss of handling, is between 0.35 and 0.38 (1/s), although this does vary according to the individual concerned. These tests were executed while changing the speed of travel, however there was no change seen in the upper value for each speed in these test. The gradient of yaw angular velocity against steering wheel angle is the ratio ($\Delta r/\Delta\delta_{SW}$) of amount of change $\Delta r$ in yaw angular velocity to amount of steering wheel angle change $\Delta\delta_{SW}$.

In a steering wheel angle region where the gradient of the yaw angular velocity against steering wheel angle has not yet reached a pre-derived upper limit value based on human factors, the yaw angular velocity derived according to above Equation (16) is taken as the target value. When the gradient of the yaw angular velocity against steering wheel angle computed from the above Equation (16) exceeds the upper limit value, the target value for the yaw angular velocity is preferably corrected so as to restrict the gradient of the yaw angular velocity against steering wheel angle to the upper value, as shown by the solid line in FIG. 6.

By setting the characteristics of the yaw angular velocity against steering wheel angle thus, in the region up to a large steering wheel angle just before excessive sensitivity is felt towards vehicle motion changes, the direction of the reference position of the steering wheel and the direction of the forward gaze point can be made to coincide with each other as viewed from the view point of the driver. In a region of larger steering wheel angle it is possible to steer the vehicle with a smaller corrected steering wheel angle without excessive sensitivity to changes in vehicle motion.

Figure 7:
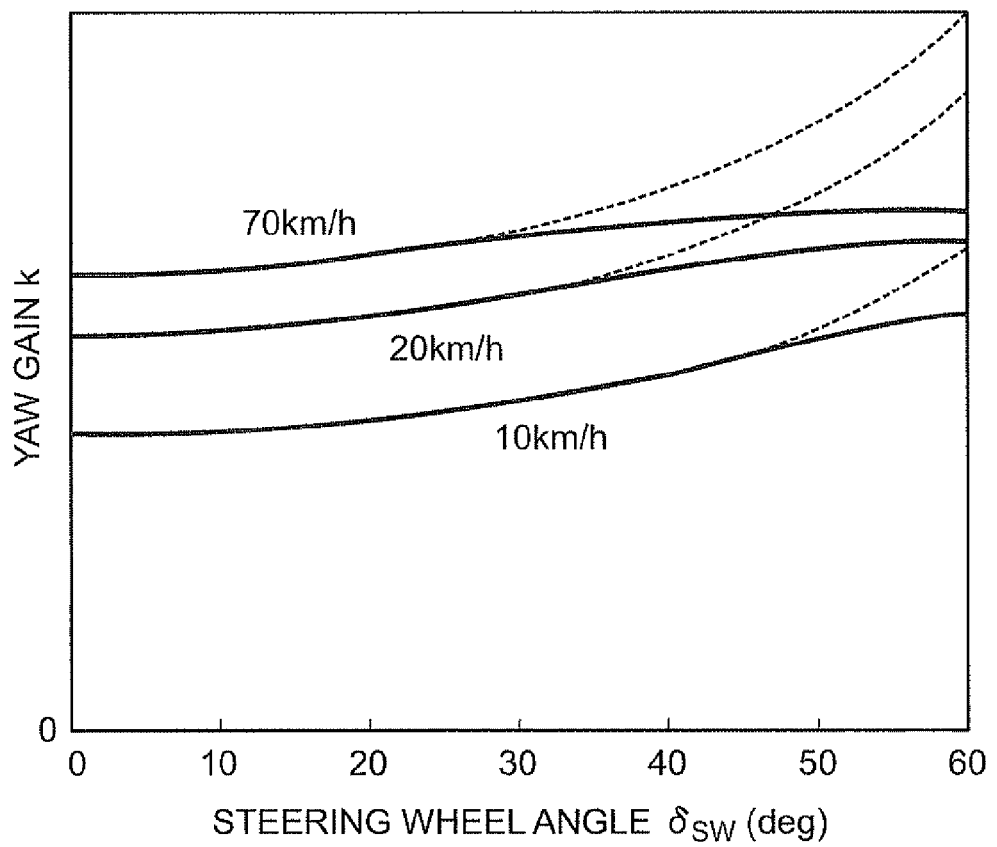
FIG. 7 is a graph illustrating a relationship of yaw angular velocity gain to steering wheel angle.

In the present exemplary embodiment, in order to derive a map expressing a relationship between the yaw angular velocity gain k, which is the ratio between steering wheel angle and yaw angular velocity, and the steering wheel angle $\delta_{SW}$, the yaw angular velocity computed according to the above Equation (16) is converted into yaw angular velocity gain in a steering wheel angle region where the gradient of the yaw angular velocity against steering wheel angle has not reached the upper limit value. In a region where the gradient of the yaw angular velocity against steering wheel angle has exceeded the upper limit value, a yaw angular velocity, which is corrected such that the gradient of the yaw angular velocity against steering wheel angle is the upper limit value, is transformed to the yaw angular velocity gain. A map such as that shown in FIG. 7 is accordingly obtained expressing relationships between the yaw angular velocity gain k and the steering wheel angle $\delta_{SW}$ for each vehicle speed. The intermittent lines shown in FIG. 7 illustrate yaw angular velocity gains derived according to Equation (16), and the solid lines show characteristics restricted to the upper limit values when the gradient of the yaw angular velocity against steering wheel angle derived from Equation (16) has exceeded the upper limit value.

Based on the principles explained above, the map determining a relationship between the steering wheel angle and the yaw angular velocity gain at each vehicle speed, as shown by the solid lines in FIG. 7, is stored in the map storage section 30 of the vehicle steering apparatus 10 according to the present exemplary embodiment.

The yaw gain computation section 32 computes, according to the map stored in the map storage section 30, the target value of yaw angular velocity gain corresponding to the vehicle speed detected by the vehicle speed sensor 26 and the steering wheel angle detected by the steering wheel angle sensor 28.

Explanation follows regarding a control method for executing yaw angular velocity gain to the target computed based on such a map.

The target yaw angular velocity gain is realized by changing the characteristics of the variable steering gear ratio mechanism 16, provided between the steering wheel and the mechanism for turning the front wheels by the actual steering angle, to become active according to the vehicle speed. If the dynamic characteristics of the vehicle motion are ignored then the relationship expressed by the following Equation (17) is held between the front wheel actual steering angle $\delta_f$ and the yaw angular velocity r.

$$r = \frac{v}{l - \frac{l_f C_f - l_r C_r}{2lC_f C_r} mv^2} \cdot \delta_f \quad (17)$$

Wherein $C_f$ is the front wheel cornering power. If $g_{sw}$ expresses the steering ratio between the steering wheel angle $\delta_{SW}$ and the front wheel actual steering angle $\delta_f$ then the following Equation (18) is obtained.

Equation (19)

$$\delta_{sw} = g_{sw} \cdot \delta_f \quad (18)$$

The steering ratio $g_{sw}$ for executing the yaw angular velocity gain k computed from the map shown in FIG. 6 using above Equation (17) and Equation (18) is expressed according to the following Equation (19).

$$g_{sw} = \frac{v}{1 - \frac{l_f C_f - l_r C_r}{2lC_f C_r} mv^2} \cdot \frac{1}{k} \quad (19)$$

The gear ratio computation section 34 computes the steering gear ratio according to Equation (19), based on the yaw angular velocity gain k computed as the target by the yaw gain computation section 32 and the vehicle speed v detected by the vehicle speed sensor 26.

The gear ratio controller 36 controls the steering gear ratio by outputting a gear ratio instruction signal to the variable steering gear ratio mechanism 16 to change to the computed steering gear ratio.

Figure 8:
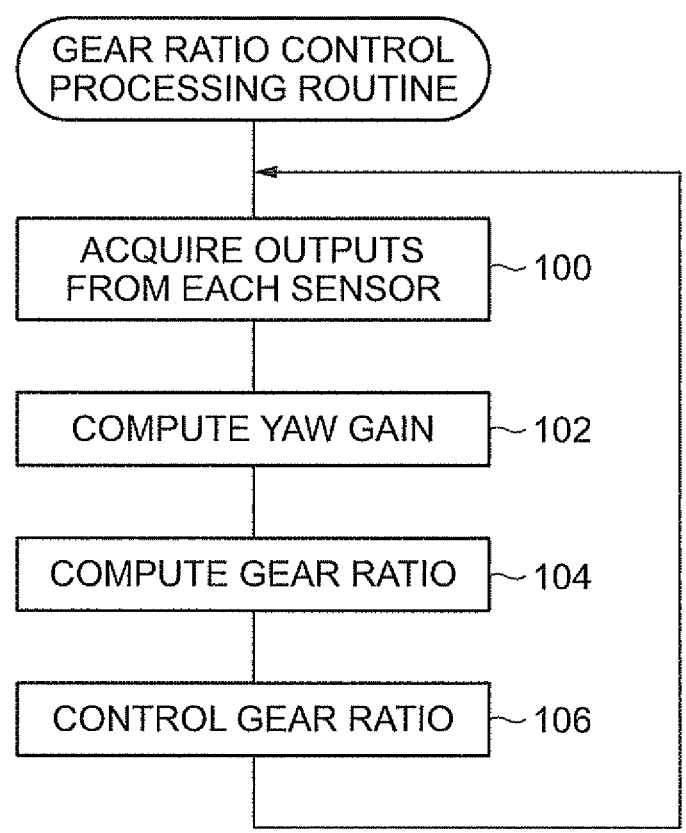
FIG. 8 is a flow chart illustrating contents of a gear ratio control processing routine of a vehicle steering apparatus according to the first exemplary embodiment of the present invention.

Explanation follows regarding operation of the vehicle steering apparatus 10 of the present exemplary embodiment. The gear ratio control processing routine illustrated in FIG. 8 is executed in the computer 24 during travel with the vehicle in which the vehicle steering apparatus 10 is installed.

At step 100 the computer 24 first acquires the vehicle speed detected by the vehicle speed sensor 26 and the steering wheel angle detected by the steering wheel angle sensor 28, respectively. At step 102 the computer 24 then, according to the map stored in the map storage section 30, computes the target value of yaw angular velocity gain from the vehicle speed and steering wheel angle acquired at step 100.

At step 104, the computer 24 then, according to Equation (19), computes the steering gear ratio to realize the yaw angular velocity gain target value, using the vehicle speed acquired at step 100 and the yaw angular velocity gain target value computed at step 102. The computer 24 then at step 106 controls the steering gear ratio by outputting a gear ratio instruction signal to the variable steering gear ratio mechanism 16 so as to change to the steering gear ratio computed at step 104, and the routine then returns to step 100.

The successively computed yaw angular velocity gain target values are realized by successively repeating execution of the above processing.

As explained above in the vehicle steering apparatus according to the first exemplary embodiment, target values of yaw angular velocity gain are computed and the steering gear ratio is controlled according to a map expressing a relationship between the steering wheel angle, determined such that the direction as seen from the view point of a driver of a target destination point on a target course for vehicle travel after a predetermined forward gaze time and the direction as seen from the view point of the driver of the steering wheel reference position coincide with each other. The vehicle steering apparatus can therefore enhance the sensation of driver-vehicle togetherness, and enable steering to be performed so as to match the driver sensation without the driver feeling discomfort.

It has been discovered that by making the direction of the steering wheel reference position coincide with the forward gaze point the sensation of driver-vehicle togetherness is enhanced, and so the yaw angular velocity gain (the gain from steering wheel angle to the yaw angular velocity) is set such that the direction as seen from the view point of the driver of the forward gaze point and the direction as seen from the view point of the driver of the steering wheel reference position coincide with each other. Such a yaw angular velocity gain is achieved by a steering gear ratio in which the forward gaze angle is proportional to the tangent to the steering wheel angle. However, in conventional technology a steering gear ratio is set such that the forward gaze angle is proportional to the steering wheel angle, and the yaw angular velocity gain described above is a characteristic that cannot be achieved using conventional technology.

Since the forward gaze angle, this being the angle formed between the target destination point after a fixed duration and the direction of travel, and the yaw angular velocity are proportional to each other, the vehicle steering apparatus of the present exemplary embodiment outputs a yaw angular velocity proportional to the tangent to the steering wheel angle. This means that the yaw angular velocity gain increases as turning of the steering wheel increases. In conventional technology in which the yaw angular velocity gain is not dependent on the steering wheel angle, in a region of a comparatively large steering input, the direction of the steering wheel reference position and the direction of the forward gaze point cannot be made to coincide with each other. In contrast thereto, with the vehicle steering apparatus according to the present exemplary embodiment, the feeling of union can be enhanced in a large steering input region as a result of the direction of the steering wheel reference position and the direction of the forward gaze point coinciding with each other even when in a region of large steering input.

In the vehicle steering apparatus of the present exemplary embodiment, by restricting the gradient of the yaw angular velocity against steering wheel angle to an upper limit value pre-derived according to human factors it becomes possible to steer a vehicle with a smaller corrected steering wheel angle in a region of large steering input, such that the driver does not experience excessive sensitivity to vehicle motion changes. The vehicle steering apparatus according to the present exemplary embodiment hence enables the sensation of driver-vehicle togetherness to be enhanced without a detrimental effect to handling.

Explanation follows regarding a vehicle steering apparatus according to a second exemplary embodiment. Portions of the configuration similar to those of the first exemplary embodiment are allocated the same reference numerals and further explanation is omitted.

The second exemplary embodiment mainly differs from the first exemplary embodiment from the perspective that a target value of the yaw angular velocity is computed and then the steering gear ratio is controlled so as to realize the target value of the yaw angular velocity.

Figure 9:
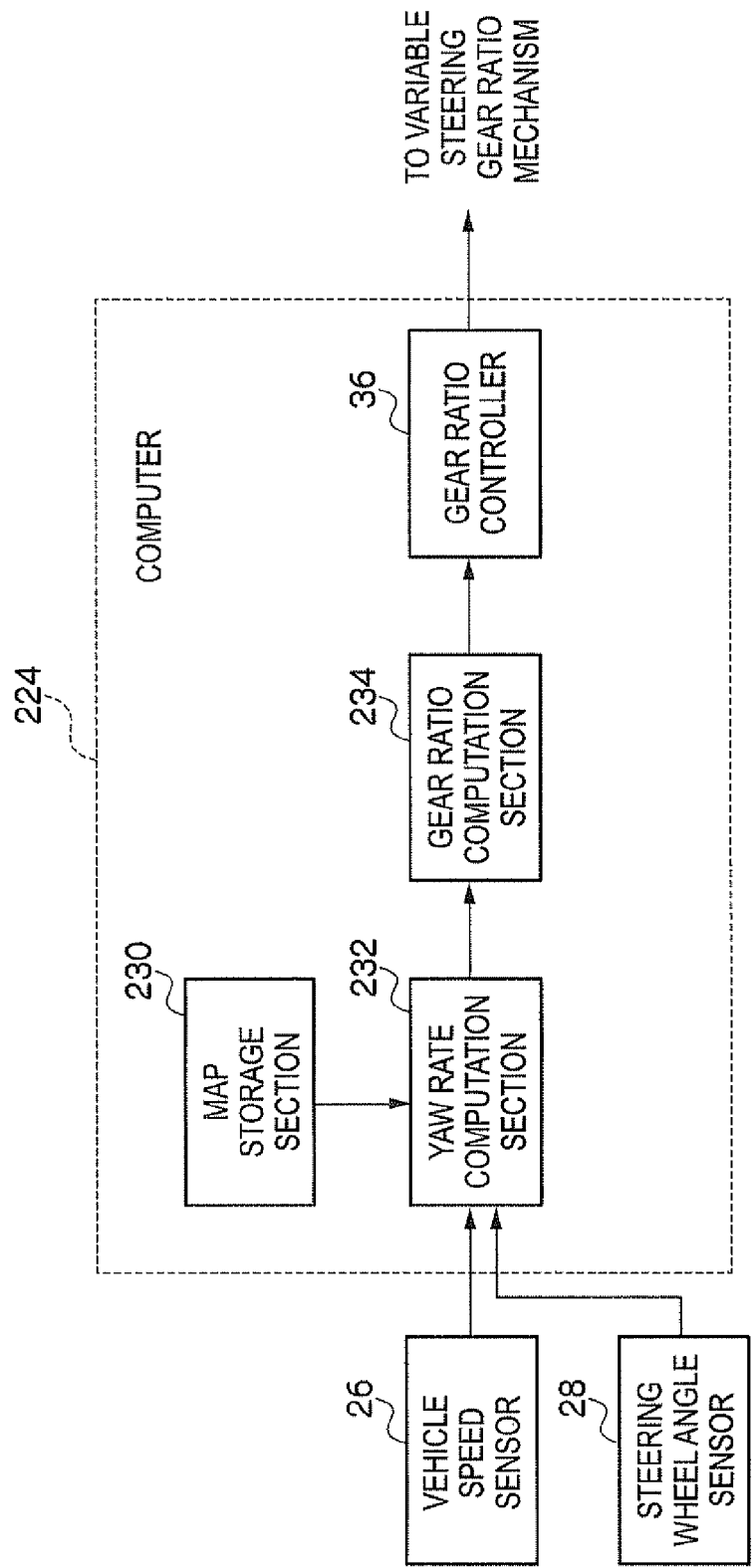
FIG. 9 is a block diagram illustrating a configuration of a computer of a vehicle steering apparatus according to a second exemplary embodiment of the present invention.

As shown in FIG. 9, the computer 224 of the vehicle steering apparatus according to the second exemplary embodiment includes: a map storage section 230 pre-stored with a map expressing relationships between a steering angle of a steering wheel 12, vehicle speed, and yaw angular velocity; a yaw rate computation section 232 for computing, based on the vehicle speed from the vehicle speed sensor 26 and the steering wheel angle from the steering wheel angle sensor 28, a target value of yaw angular velocity according to the map stored in the map storage section 230; and a gear ratio computation section 234 for computing the steering gear ratio to realize the computed yaw angular velocity; and a gear ratio controller 36.

Figure 10:
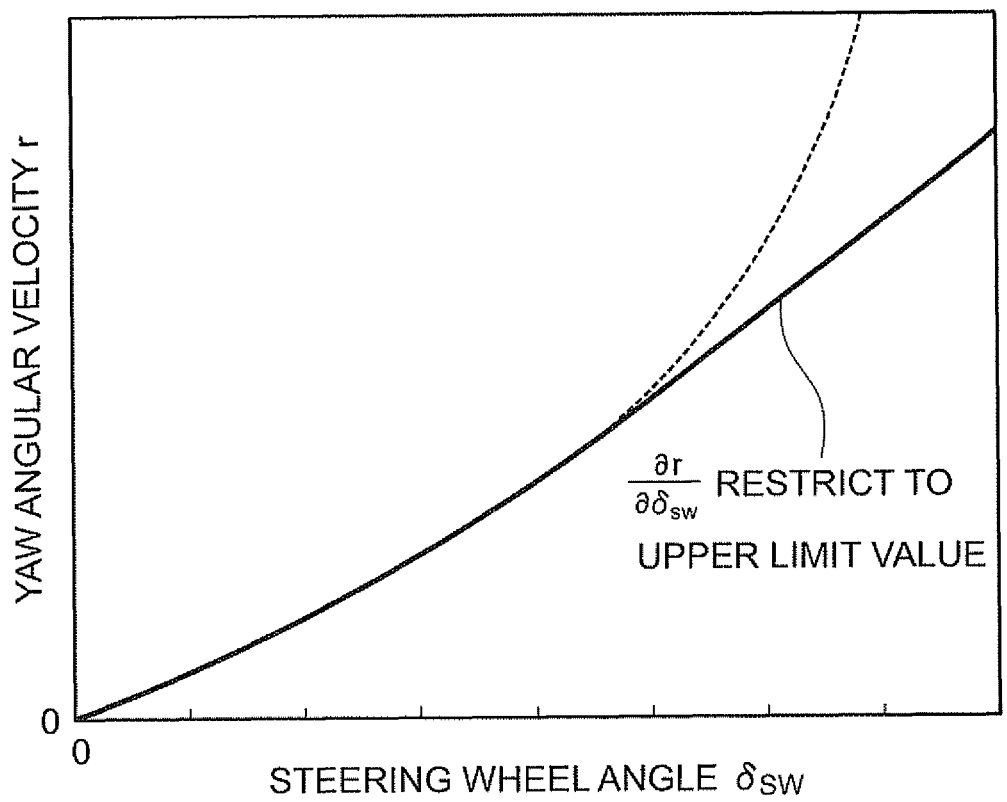
FIG. 10 is a graph illustrating a relationship of yaw angular velocity to steering wheel angle.

A relationship between the steering wheel angle and the yaw angular velocity are obtained at each vehicle speed, as shown by the intermittent lines in FIG. 10, by using numerical methods to solve Equation (16) as described in the first exemplary embodiment. Similarly to in the first exemplary embodiment, by correcting the target value of the yaw angular velocity such that the gradient of the yaw angular velocity against steering wheel angle is restricted to an upper limit value, a relationship between the steering wheel angle and the yaw angular velocity is then obtained for each vehicle speed, as shown in the solid lines of FIG. 10.

The map storage section 230 of the vehicle steering apparatus of the present exemplary embodiment is stored with a map determining relationships between the steering wheel angle and the yaw angular velocity for each vehicle speed, as illustrated by the solid lines in FIG. 10.

The yaw rate computation section 232 computes, according to the map stored in the map storage section 230, the yaw angular velocity corresponding to the vehicle speed detected by the vehicle speed sensor 26 and the steering wheel angle detected by the steering wheel angle sensor 28.

Based on the target yaw angular velocity r computed by the yaw rate computation section 232 and the vehicle speed v detected by the vehicle speed sensor 26, the gear ratio computation section 234 computes, according to Equation (17), the front wheel actual steering angle $\delta_f$ for realizing the targeted yaw angular velocity r. The gear ratio computation section 234 computes the steering gear ratio according to Equation (18) and based on the computed front wheel actual steering angle $\delta_f$ and the steering wheel angle $\delta_{SW}$ detected by the steering wheel angle sensor 28.

Explanation follows regarding a gear ratio control processing routine according to the second exemplary embodiment.

The computer 224 first respectively acquires the vehicle speed detected by the vehicle speed sensor 26 and the steering wheel angle detected by the steering wheel angle sensor 28. The computer 224 then computes, according to the map stored in the map storage section 230, the target value of the yaw angular velocity based on the acquired vehicle speed and steering wheel angle.

The computer 224 then computes the steering gear ratio for realizing the target yaw angular velocity according to Equation (17) and Equation (18) from the acquired vehicle speed and the computed yaw angular velocity target value. The computer 224 controls the steering gear ratio by outputting to the variable steering gear ratio mechanism 16 a gear ratio instruction signal to change to the computed steering gear ratio, and the routine then returns to the initial processing.

Each of the repeatedly computed yaw angular velocity target values are realized by repeatedly executing the above processing.

As explained above, the vehicle steering apparatus according to the second exemplary embodiment computes a target value for a yaw angular velocity and controls the steering gear ratio according to a map expressing the relationship between a steering wheel angle and yaw angular velocity determined to making the direction as seen from the view point of a driver of a target destination point on a target course for vehicle travel after a predetermined forward gaze time and the direction as seen from the view point of the driver of the steering wheel reference position coincide with each other. The vehicle steering apparatus is thereby capable of enhancing the sensation of driver-vehicle togetherness, and enables steering to be performed matching driver sensation without a driver feeling discomfort.

Explanation follows regarding a vehicle steering apparatus according to a third exemplary embodiment. Portions of the configuration similar to those of the first exemplary embodiment are allocated the same reference numerals and further explanation thereof is omitted.

The third exemplary embodiment mainly differs from the first exemplary embodiment from the perspective that a steering gear ratio that depends on the steering wheel angle is realized mechanically.

Figure 11:
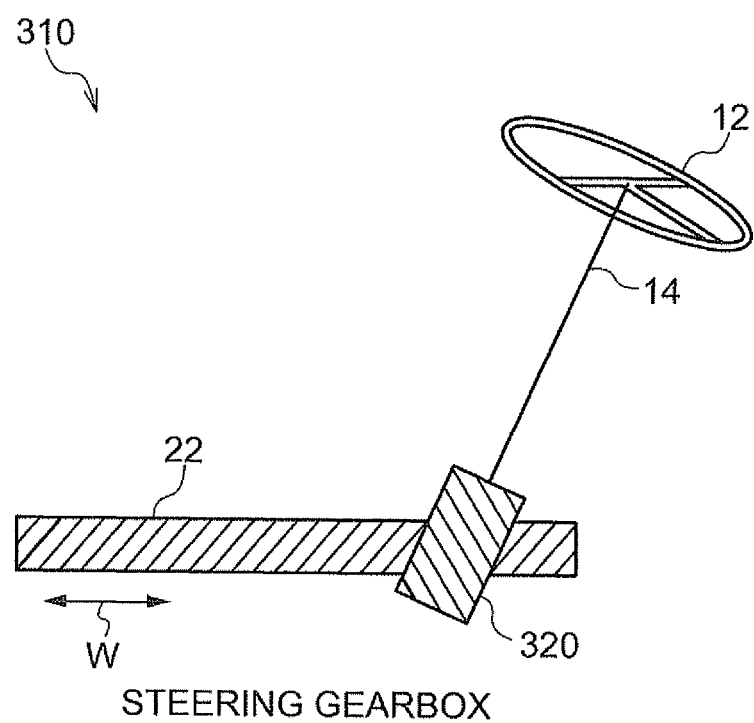
FIG. 11 is a schematic diagram illustrating a configuration of a steering wheel angle according to a third exemplary embodiment of the present invention.

As shown in FIG. 11, in a steering wheel angle 310 according to the third exemplary embodiment a pinion 320 coupled to a rotating shaft 14 interlocked to a steering wheel 12 is meshed with a rack shaft 22 coupled to steerable wheels, not shown in the drawings.

Rotation of the steering wheel 12 is hence transmitted through the rotating shaft 14 to the pinion 320 so as to move the rack shaft 22 along its axial direction (the arrow W direction of FIG. 1), thereby turning the steerable wheels.

The pinion gear of the pinion 320 is designed as set out below.

The relationship between the steering wheel angle and the yaw angular velocity gain at a specific speed (say at 50 to 60 km/h) is first derived from relationships between the steering wheel angle and the yaw angular velocity gain at each vehicle speed, as illustrated by the solid lines in FIG. 7 as explained in the first exemplary embodiment.

The steering gear ratio depending on the steering wheel angle is then derived based on the derived relationships between the steering wheel angle and the yaw angular velocity gain, and on Equation (19).

The pinion gear of the pinion 320 is then designed so as to realize the steering gear ratio corresponding to the derived steering wheel angle.

Due to the pinion gear of the pinion 320, a vehicle installed with the steering wheel angle 310 according to the present exemplary embodiment has a steering gear ratio depending on the steering wheel angle that realizes the yaw angular velocity gain target value.

Hence when travelling at the specific speed the steering wheel angle 310 is capable of making the direction of the steering wheel reference position as seen from the viewpoint of the driver and the direction as seen from the view point of the driver of the forward gaze point coincide with each other in a region up to a large steering input angle just prior to when excessive sensitivity to changes in vehicle motion is felt. In a region of even greater steering wheel angle it is possible for the driver to steer the vehicle with a smaller corrected steering wheel angle and excessive sensitivity to vehicle motion is not felt.

Explanation has been given in the above exemplary embodiment of cases in which the steering gear ratio is designed according to the relationship between the steering wheel angle and the yaw angular velocity gain expressed in the map employed in the first exemplary embodiment, however there is no limitation thereto. Configuration may be made such that the steering gear ratio is designed according to the relationship between the steering wheel angle and the yaw angular velocity expressed in the map explained in the second exemplary embodiment. In such cases, the relationship between the steering wheel angle and the yaw angular velocity at a specific speed (say at 50 to 60 km/h) is first derived from relationships between the steering wheel angle and the yaw angular velocity at each vehicle speed, as illustrated by the solid lines in FIG. 10 as explained in the second exemplary embodiment. The steering gear ratio depending on the steering wheel angle is then derived based on the relationship between the derived steering wheel angle and the yaw angular velocity, and on Equation (17) and Equation (18). The pinion gear of the pinion 320 is then designed so as to realize the steering gear ratio corresponding to the derived steering wheel angle.

While explanation in the first exemplary embodiment to the third exemplary embodiment has been given of examples of cases in which front wheel steering is controlled there is no limitation thereto. Configuration may be made such that control is performed by rear wheel steering. In such cases the steering gear ratio of the rear wheels to realize the target value of yaw angular velocity gain or the target value of yaw angular velocity is computed based on a formula derived by using relationships between the rear wheel actual steering angle and the yaw angular velocity. Configuration may also be made in which steering is controlled for both the front wheels and the rear wheels. In such cases the steering gear ratio is computed for the front and rear wheels to realize the target value of the yaw angular velocity gain or the target value of the yaw angular velocity based on a formula derived by using the relationships between the actual steering angle of the front wheels, the actual steering angle of the rear wheels and the yaw angular velocity.

EXPLANATION OF THE REFERENCE NUMERALS 10, 310 VEHICLE STEERING APPARATUS
12 STEERING WHEEL
16 VARIABLE STEERING GEAR RATIO MECHANISM
20, 320 PINION
24, 224 COMPUTER
26 VEHICLE SPEED SENSOR
28 STEERING WHEEL ANGLE SENSOR
30, 230 MAP STORAGE SECTION
32 YAW GAIN COMPUTATION SECTION
34, 234 GEAR RATIO COMPUTATION SECTION
36 GEAR RATIO CONTROLLER
232 YAW RATE COMPUTATION SECTION

The invention claimed is:

1. A steering apparatus for steering in a vehicle, the steering apparatus comprising:
   a controller configured to control a steering gear ratio so as to effect a relationship between a steering wheel angle and a yaw angular velocity generated by the vehicle, the relationship being calculated based on: (1) a target direction of a target destination point on a target course for vehicle travel as seen from the viewpoint of a driver after a predetermined forward gaze time and (2) a reference direction of a reference position on the steering wheel as seen from the viewpoint of the driver such that the target direction and the reference direction coincide with each other.

2. The steering apparatus of claim 1 wherein the forward gaze time is set at from 2.5 seconds to 3.5 seconds.

3. The steering apparatus of claim 1 wherein the relationship between the steering wheel angle and the yaw angular velocity is determined so as to generate a yaw angular velocity proportional to a tangent to a relative angle between the steering wheel angle and a roll angle occurring in the vehicle.

4. The steering apparatus of claim 3 wherein the relationship between the steering wheel angle and the yaw angular velocity is determined such that the yaw angular velocity generated is proportional to the tangent to the relative angle between the steering wheel angle and the roll angle occurring in the vehicle, and a gradient of the yaw angular velocity with respect to the steering wheel angle is restricted to a predetermined upper limit value based on human factors.

5. The steering apparatus of claim 4 wherein the upper limit value is set at 0.35 to 0.38 (l/s).

6. The steering apparatus of claim 1 comprising:
   a vehicle speed detection section for detecting the speed of the vehicle;
   a steering wheel angle detection section for detecting the steering wheel angle;
   a yaw angular velocity gain computation section for computing a yaw angular velocity gain based on the vehicle speed detected by the vehicle speed detection section, the steering wheel angle detected by the steering wheel angle detection section and a relationship between the steering wheel angle and the yaw angular velocity at each speed; and
   a controller for controlling a steering gear ratio so as to realize the yaw angular velocity gain computed by the yaw angular velocity gain computation section.

7. The steering apparatus of claim 6 wherein the yaw angular velocity gain computation section computes the yaw angular velocity gain based on the vehicle speed detected by the vehicle speed detection section, the steering wheel angle detected by the steering wheel angle detection section and a relationship between the steering wheel angle and the yaw angular velocity gain which is determined in advance based on the relationship between the steering wheel angle and the yaw angular velocity at each vehicle speed.

8. The steering apparatus of claim 1 comprising:
   a vehicle speed detection section for detecting the speed of the vehicle;
   a steering wheel angle detection section for detecting a steering wheel angle;
   a yaw angular velocity gain computation section for computing a yaw angular velocity gain based on the vehicle speed detected by the vehicle speed detection section, the steering wheel angle detected by the steering wheel angle detection section, and a relationship between the steering wheel angle and the yaw angular velocity at each vehicle speed; and
   a controller for controlling a steering gear ratio such that a target yaw angular velocity gain computed by the yaw angular velocity gain computation section is realized.

* * * * *